United States Patent [19]

Takada et al.

[11] Patent Number: 5,091,636
[45] Date of Patent: Feb. 25, 1992

[54] APPARATUS FOR DETECTING MODULATED INFORMATIONS FROM EMITTED LIGHT TURNED BY AN OBJECT

[75] Inventors: Hirohisa Takada, Tokyo; Shosuke Tanaka, Kanagawa, both of Japan

[73] Assignee: Sony Corporation, Tokyo, Japan

[21] Appl. No.: 726,650

[22] Filed: Jul. 3, 1991

Related U.S. Application Data

[63] Continuation of Ser. No. 295,552, Jan. 11, 1989, abandoned.

[30] Foreign Application Priority Data

Feb. 23, 1988 [JP] Japan .................. 63-039985
Feb. 29, 1988 [JP] Japan .................. 63-046631

[51] Int. Cl.⁵ .................... G06K 70/1; G06K 7/14
[52] U.S. Cl. ......................... 235/454; 235/462; 235/472
[58] Field of Search .............. 235/454, 462, 472; 250/566

[56] References Cited

U.S. PATENT DOCUMENTS

| | | | |
|---|---|---|---|
| 4,011,435 | 3/1977 | Phelps | 235/470 |
| 4,020,327 | 4/1977 | Geary | 235/454 |
| 4,688,984 | 5/1985 | Hockert | |
| 4,691,993 | 5/1985 | Porter | |
| 4,831,275 | 5/1989 | Drucker | 235/462 |

*Primary Examiner*—Harold Pitts
*Attorney, Agent, or Firm*—Lewis H. Eslinger; Jay H. Maioli

[57] ABSTRACT

An apparatus for detecting modulated informations from emitted light turned around by an object is disclosed, in which a non-modulation interval is provided in a light signal from a transmitting side, an information from the transmitting side is received at a receiving side by its light receiving elements and the light signal from the transmitting side during the non-modulation interval is modulated and then reflected back to the transmitting side thereby transmitting a signal. Consequently, the space and the cost of the receiving side can be reduced, and the optical axes of the transmitting side and the receiving side can be positively adjusted with ease. Also, according to the present invention, a bar code is disclosed, which includes an optical recursive reflection member which reflects back a light incident thereon in substantially the same direction of the incident light. This bar code further includes a shutter which can modulate a code.

2 Claims, 10 Drawing Sheets

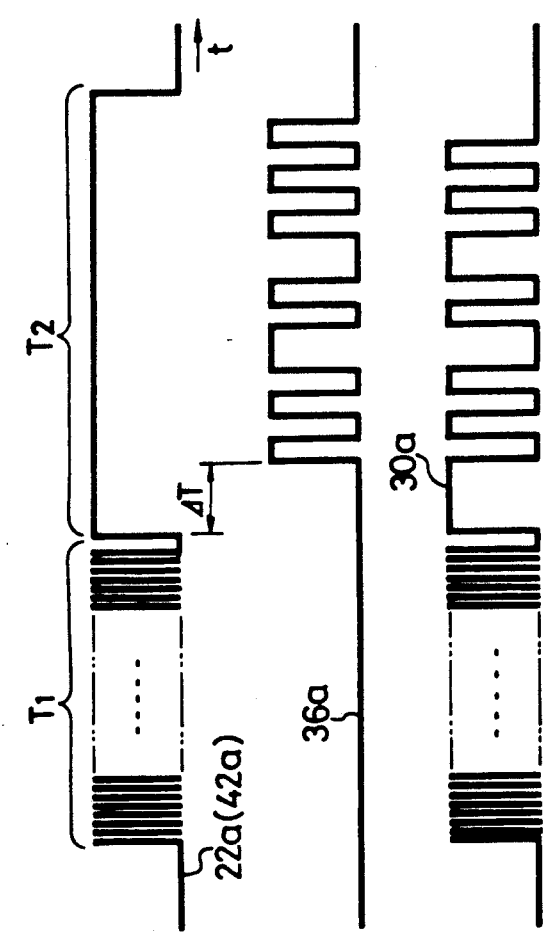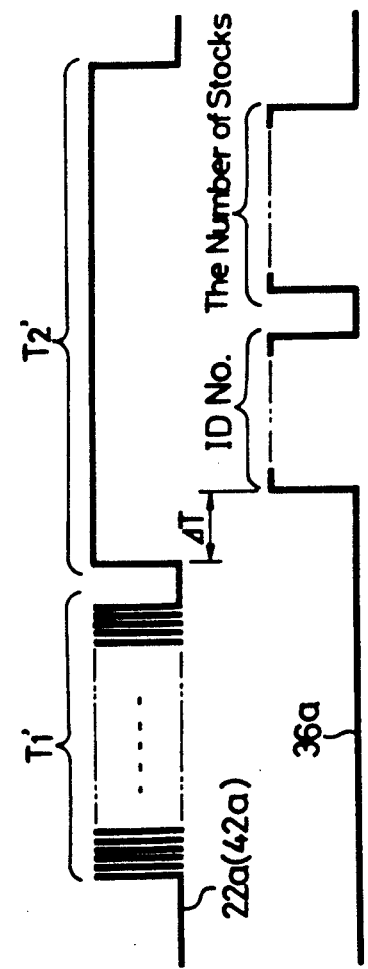

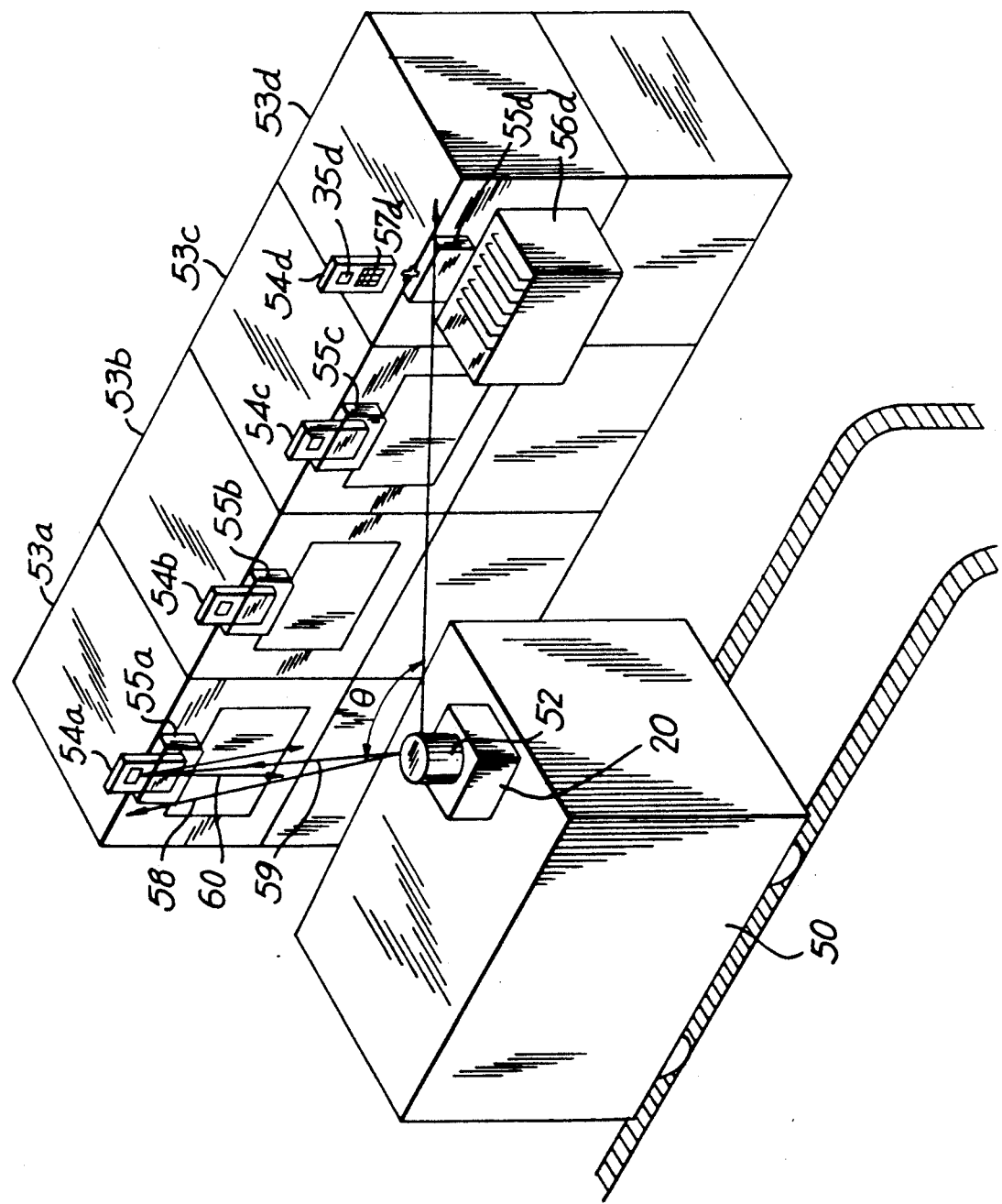

APPARATUS FOR DETECTING MODULATED INFORMATIONS FROM EMITTED LIGHT TURNED BY AN OBJECT

This is a continuation of application Ser. No. 07/295,552, filed 1-11-89 now abandoned.

BACKGROUND OF THE INVENTION

1. Field of the Invention

The present invention relates to an apparatus for detecting modulated informations from emitted light turned around by an object which is for use with, for example, optical communication. More particularly, this invention relates to a bar code suitable for use with, for example, a physical distribution administration system, a POS (point of sale) system and the like.

2. Description of the Prior Art

With the development of fiber optic technology and semiconductor technology including laser diodes, optical communication systems have been realized in various technical fields. Of the optical communication systems, a prior art bidirectional atmospheric optical transmission system is illustrated in FIG. 1.

In FIG. 1, reference numeral 1 generally designates one transmitter-receiver and reference numeral 10 on the right-hand side of FIG. 1 designates another transmitter-receiver, respectively.

In the transmitter-receiver 1, reference numeral 2 designates a processing circuit which demodulates a received signal or modulates a transmitting signal. Also, this processing circuit 2 is adapted to decode the demodulated received data. The transmitting signal delivered from the processing circuit 2 is amplified by a driving circuit 3 thereby to cause a laser diode 4 to turn on and off. The light emitted from the laser diode 4 is collimated to be a substantially collimated light signal by a lens system 5. A lens system 6 is provided to collect a light signal 18 from the side of the transmitter-receiver 10 and converge the same on a light receiving element 7. A photo-electric conversion signal from the light receiving element 7 is supplied through a pre-amplifier 8 to the processing circuit 2.

Similarly in the other transmitter-receiver 10, reference numeral 11 designates a processing circuit that acts in the same way as that of the processing circuit 2. This processing circuit 11 modulates a laser diode 13 via a driving circuit 12. The light emitted from the laser diode 13 is collimated to become the light signal 18 by a lens system 14. Further, a light signal 9 from the transmitter-receiver 1 is supplied through a lens system 15, a light receiving element 16 and a pre-amplifier 17 to the processing circuit 11. Accordingly, the transmitter-receivers 1 and 10 can exchange informations through the light signals 9 and 18 because their optical axes 9a and 18a are made in parallel to each other.

However, when such a conventional bidirectional atmospheric optical transmission system is applied to a kind of so-called mini-broadcasting stations where the transmitter-receiver 1, for example, is employed as a central control apparatus (hereinafter, referred to as "transmitting side") and the transmitter-receiver 10 is used as one of a plurality of receiving units (hereinafter, referred to as "receiving side") which receives the information from the central control apparatus and which only returns an information such as a simple ID number or the like, regardless of the small amount of informations to transmit, the receiving side 10 has to include an optical system that comprises, for example, the laser diode 13 and the lens system 14 similarly to that of the transmitting side 1. Thus, the apparatus is made large in size and the manufacturing cost thereof is increased.

Further, in the prior art bidirectional atmospheric optical transmission system, as shown in FIG. 1, the optical axis 9a of the transmitter-receiver 1 has to coincide with that of the lens system 15 in the transmitter-receiver 10 and also, the optical axis 18a of the transmitter 10 has to coincide with that of the lens system 6 in the transmitter-receiver 1, thus requiring the double accurate optical axis adjustment. In order to alleviate the optical axis adjustment, it is considered to use ultrasonic waves as is disclosed in the embodiment of Official Gazette of Japanese Laid-Open Patent Application No. 54-100222. In that case, there is then a risk that radio interference will occur.

OBJECTS AND SUMMARY OF THE INVENTION

Accordingly, it is an object of the present invention to provide an apparatus for detecting modulated informations from emitted light turned around or reflected by an object in which the receiving side can be made compact in size.

It is another object of the present invention to provide an apparatus for detecting modulated informations from emitted light turned around by an object in which the receiving side can be produced at low cost.

It is still another object of the present invention to provide an apparatus for detecting modulated informations from emitted light turned around by an object in which the power consumption at the receiving side can be suppressed small.

It is still another object of the present invention to provide an apparatus for detecting modulated informations from emitted light turned around by an object in which optical axes of the receiving side and the transmitting side can be adjusted with ease.

It is still another object of the present invention to provide an apparatus for detecting modulated informations from emitted light turned around by an object in which the receiving side does not have to be disposed in a correct opposing relation to the transmitting side with accuracy.

It is a further object of the present invention to provide an improved bar code which can obviate the defects encountered with the prior art.

It is a further object of the present invention to provide a bar code by which a light receiving portion can be simplified in arrangement and produced at low cost.

It is a yet further object of the present invention to provide a bar code by which a code can be positively read even when a distance between a bar code and a bar code reader is long and also a relative displacement speed therebetween is large.

It is a still further object of the present invention to provide a bar code which can display different codes in response to the situation of articles with bar codes attached thereto.

According to one aspect of the present invention, there is provided an apparatus for detecting modulated informations from an emitted light turned around by an object, characterized in that a non-modulation interval is provided in a light signal from a transmitting side, an information from said transmitting side is received at a receiving side by its light receiving elements and said light signal from said transmitting side during said non-modulation interval is modulated and then reflected back to said transmitting side thereby transmitting a signal.

According to other aspect of the present invention, there is provided a bar code characterized in that said bar code is formed of an optical recursive reflection member which reflects back a light incident thereon in substantially the same direction of said incident light.

According to a further aspect of the present invention, there is provided a bar code characterized in that said bar code is formed of an optical recursive reflection member which reflects back a light incident thereon in substantially the same direction of said incident light and a shutter which can modulate a code.

These, and other objects, features and advantages of the present invention will become apparent from the following detailed description of the preferred embodiments of the invention, to be taken in conjunction with the accompanying drawings, in which like reference numerals identify like elements and parts.

BRIEF DESCRIPTION OF THE DRAWINGS

FIGS. 5A to 5C are waveform diagrams used to explain the action of the embodiment of FIG. 2, respectively;

FIG. 6 is a perspective view of an automatic parts supplying system to which is applied the bidirectional atmospheric optical transmission system of the present invention;

FIGS. 7A and 7B are waveform diagrams used to explain the action of the automatic parts supplying system shown in FIG. 6, respectively;

DETAILED DESCRIPTION OF THE PREFERRED EMBODIMENTS

Now, a bidirectional atmospheric optical transmission system according to the present invention will be described hereinafter with reference to the drawings.

Figure 1:
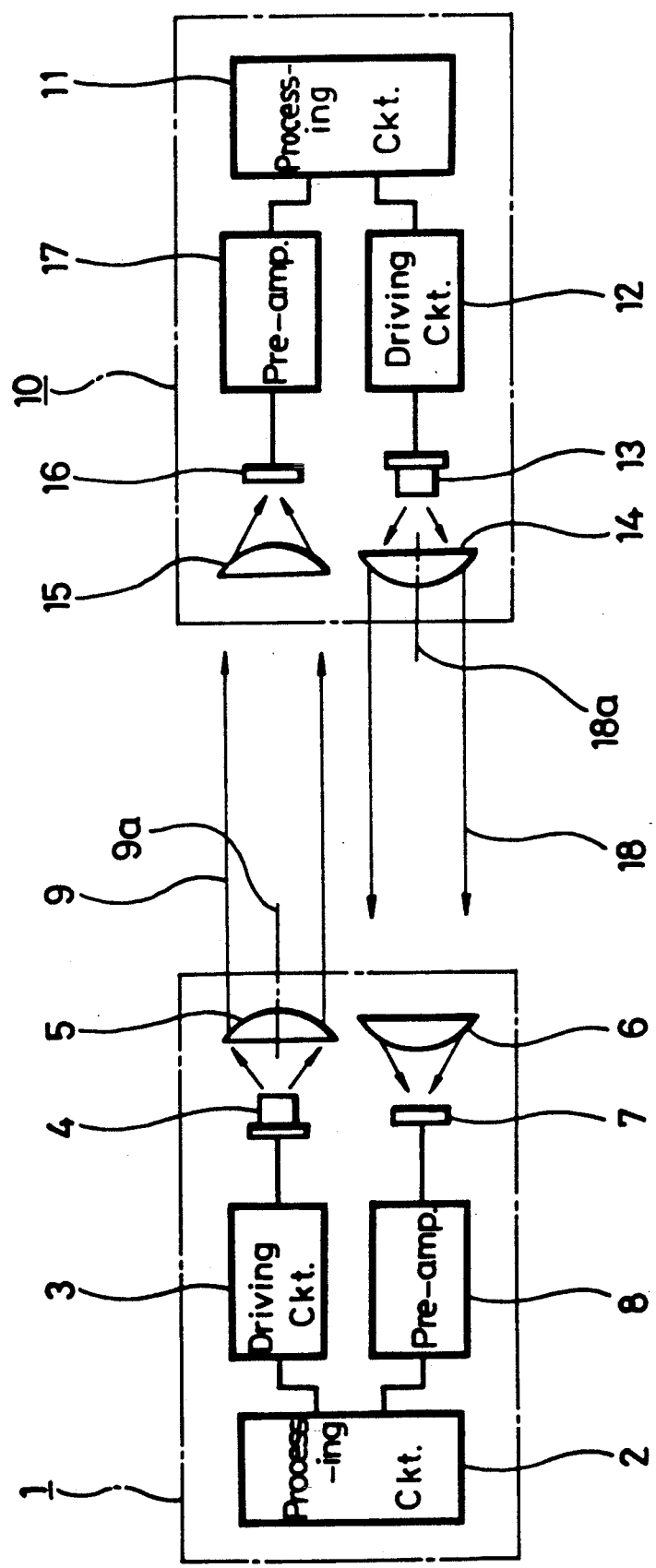
FIG. 1 is a block diagram showing an example of a prior art bidirectional atmospheric optical transmission system.
Figure 2:
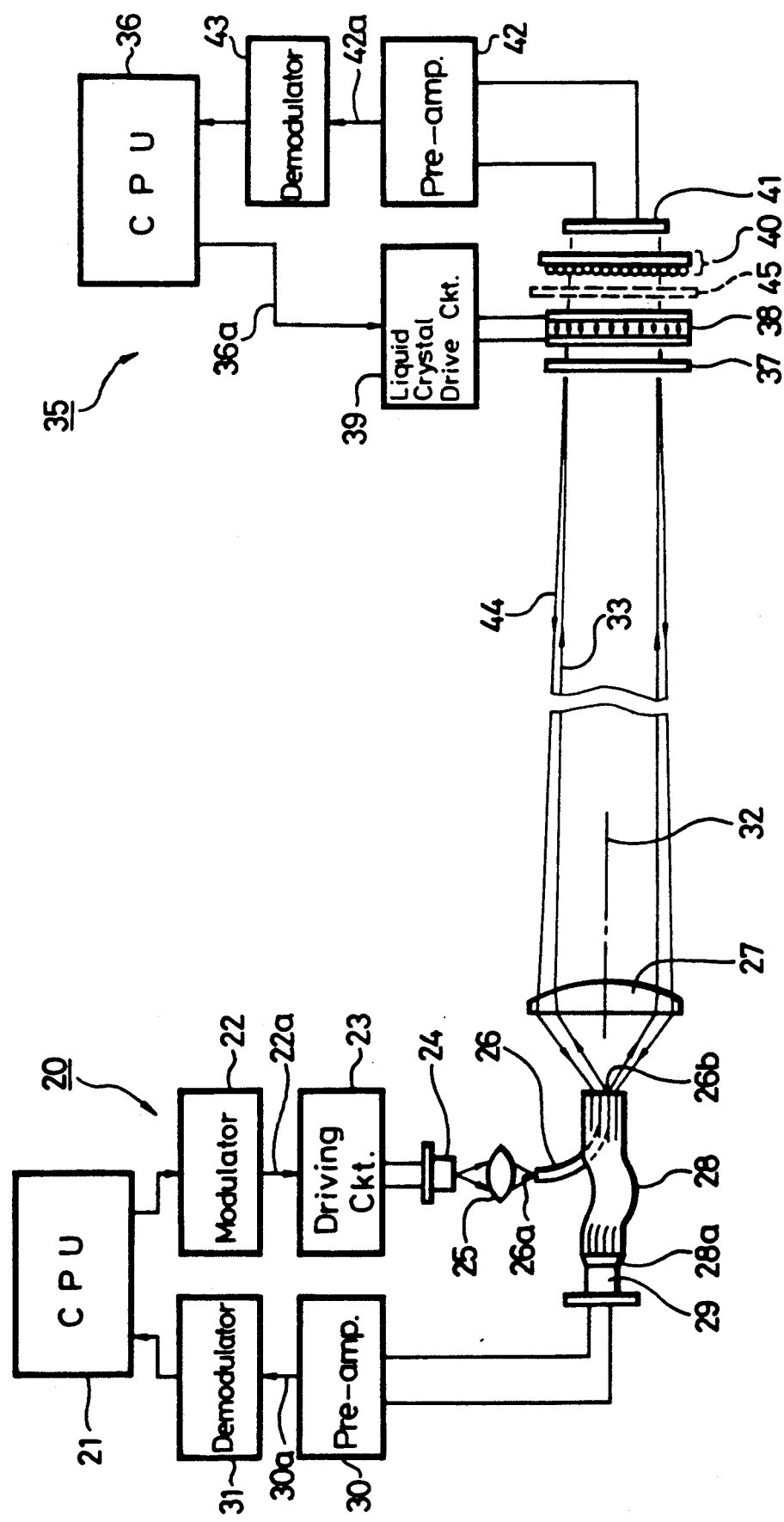
FIG. 2 is a block diagram showing an embodiment of a bidirectional atmospheric optical transmission system according to the present invention.

FIG. 2 shows an embodiment of a bidirectional atmospheric optical transmission system according to the present invention. In FIG. 2, reference numeral 20 generally designates a transmitting side that transmits a large amount of data, while reference numeral 35 generally designates a receiving side which receives those data and which returns data such as an ID number and the like. In the transmitting side 20, there is provided a central processing unit (CPU) 21 which generates transmission data to be transmitted to the receiving side 35 which are then supplied to a modulator 22. This CPU 21 also decodes data transmitted back from the receiving side 35. During the period in which a command indicating the modulation interval is issued from the CPU 21, the modulator 22 modulates the transmission data transmitted from the CPU 21 on a carrier wave having a constant frequency and transmits the thus obtained modulated transmission signal 22a to a driving circuit 23. Further, during the period in which a command indicating the non-modulation interval is issued from the CPU 21, the modulator 22 keeps transmitting a signal of high level "1" as the transmission signal 22a. The driving circuit 23 current-converts the modulated transmission signal 22a to cause a laser diode 24 to turn on and off. The light from the laser diode 24 is converged by a lens system 25 at one end 26a of an optical fiber 26, while a laser light is radially emitted from the other end 26b of the optical fiber 26. A collimator lens 27 is provided whose focus is on the other end 26b of the optical fiber 26. The collimator lens 27 collimates the laser light derived from the other end 26b of the optical fiber 26 which is collimated around an optical axis 32 to become a light signal 33. This light signal 33 is transmitted to the receiving side 35. An optical fiber bundle 28 has mixed thereinto at its middle point the optical fiber 26. The other end 26b of the optical fiber 26 is located at the center of one end of the optical fiber bundle 28, while the other end of the optical fiber bundle 28 is connected with a light receiving element 29 such as a photo-diode or the like via an adhesive agent 28a. The output from the light receiving element 29 is amplified by a pre-amplifier 30 to become a photo-electric conversion signal 30a, further demodulated to be digital outgoing data by a demodulator 31 and then fed to the CPU 21.

In the receiving side 35, reference numeral 36 designates a CPU which decodes the transmission data transmitted from the transmitting side 20 and which generates outgoing data 36a that is to be transmitted back to the transmitting side 20. Also, the CPU 36 functions to determine whether the signal from the transmitting side 20 lies in the non-modulation interval or not. A polarizing plate 37 is provided to receive the light signal 33 transmitted from the transmitting side 20. Reference numeral 38 designates an electrically-controlled birefringence (ECB) type liquid crystal cell that is applied with a voltage from a liquid crystal drive circuit 39 in response to the data 36a. Reference numeral 40 designates a reflection member which reflects a light beam incident thereon in the same direction as that of the incident direction. This reflection member 40 will be hereinafter referred to as an optical recursive reflection member. A light receiving element 41 is made of a material such as an amorphous silicon or the like that photoelectric-converts a light component passing through the optical recursive reflection member 40. When the liquid crystal cell 38 is not applied with a voltage from the liquid crystal drive circuit 39, the light signal 33 from the transmitting side 20 is reflected by about its 80% directly in the incident direction by the optical recursive reflection member 40 thereby to become a reflection light signal 44. When the liquid crystal cell 38 is applied with a voltage from the liquid crystal drive circuit 39, the reflection light signal 44 is not produced substantially in cooperation with the polarizing plate 37 and the liquid crystal cell 38. Thus, the liquid crystal cell 38 acts as a kind of an optical shutter. The ECB-type liquid crystal cell 38 may be replaced with a T-N (twisted-nematic) effect-type liquid crystal cell. In that case, a polarizing plate 45 of which the polarizing direction is perpendicular to that of the polarizing plate 37 has to be inserted thereinto. A pre-amplifier 42 is provided to amplify the photo-electric conversion signal from the light receiving element 41 to produce a photo-electric conversion signal 42a. Further, a demodulator 43 is provided to demodulate the photo-electric conversion signal 42a which is therefore supplied to the CPU 36 as transmission data.

An example of the above-mentioned optical recursive reflection member 40 will be described with reference to FIG. 3.

Figure 3:
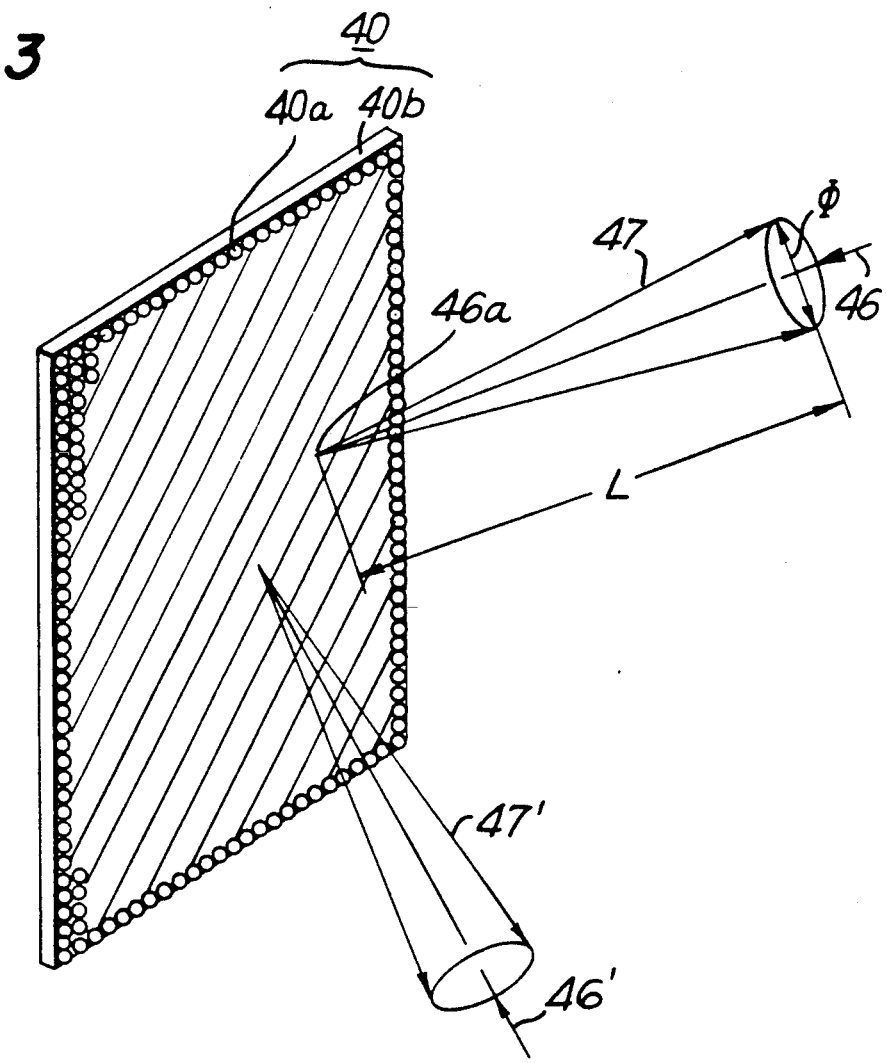
FIG. 3 is a schematic diagram of an optical recursive reflection member used in the bidirectional atmospheric optical transmission system shown in FIG. 2.

As FIG. 3 shows, the optical recursive reflection member 40 is formed by bonding a large number of very small glass beads 40a without spacing thereamong on a mount 40b which is partially made of a material having an optical transmissivity by, for example, a bonding agent having a refractive index different from that of glass. Glass beads 40a are not shown in the hatched area in FIG. 3 for simplicity. Each glass bead 40a may be a ball made of glass and having a diameter d of about 0.1 mm which is selected by a sieve of 200 meshes per inch. The diameter d and the refractive index of the glass bead 40a are adjusted depending on the wavelength of a laser light used. The optical recursive property is referred to such that as shown in FIG. 3, when an incident light 46 becomes incident thereon, a reflected light 47 thereof is reflected substantially in parallel to the direction in which the incident light 46 becomes incident. Thus, when the incident light is introduced from the direction shown by an arrow 46', a reflected light 47' thereof is reflected in the direction that is substantially parallel to the direction of the arrow 46'. According to the results of the experiments done by the present inventors, when the diameter of the beam spot 46a formed on the optical recursive reflection member 40 by the incident light 46 is about 2 mm, a spread diameter Φ of the reflected light 47 is about 12 mm at the place that is distant 500 mm from the beam spot 46a by a length L and the power thereof is about 80% of the power of the incident light 46. Therefore, a solid angle ωeff of the reflected light 47 is expressed as $$\omega{\rm eff} \sim \pi(6/500)^2 \sim 5 \times 10^{-4} \text{ (sr)}$$

In view of an aspect that the solid angle is in substantially the order of $\pi$(sr) in the standard irregular reflection, the power of the reflection light 47 in the very small solid angle is about more than 1000 times.

A principle that the optical recursive reflection member 40 in FIG. 3, i.e., has the optical recursive property, will be described with reference to an illustration forming FIG. 4.

Figure 4:
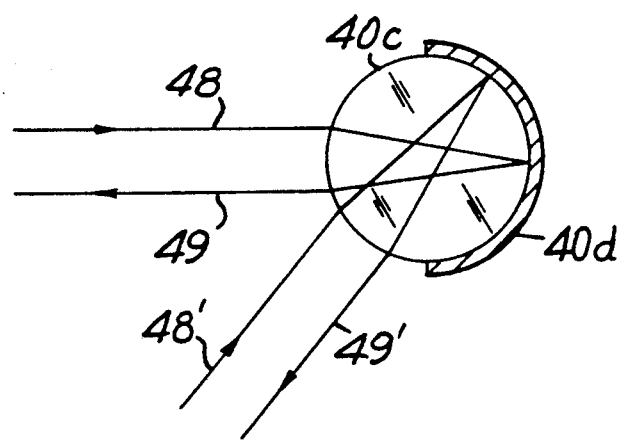
FIG. 4 is an illustration used to explain a principle of the optical recursive reflection member shown in FIG. 3.

In FIG. 4, reference numeral 40c designates a glass ball and 40d designates an aluminum-deposited-film. If a light becomes incident on this glass ball 40c from the direction as, for example, shown by an arrow 48, the refraction on the glass surface and the reflection on the aluminum-deposited-film surface cause the incident light to be reflected in the direction substantially parallel to the incident light as represented by an arrow 49. In a like manner, if the light becomes incident thereon from the direction shown by an arrow 48', the incident light is reflected in the direction substantially parallel to the direction shown by the arrow 48' as represented by an arrow 49'. In this way, all of the light beams incident thereon from the left half of the glass ball 40c are substantially reflected in their incident directions. Since this phenomenon occurs regardless of the diameter of the glass ball 40c, the optical recursive reflection member 40 which is coated with many very small glass beads 40a as shown in FIG. 3 is given the optical recursive property based on a kind of microprism effect. In this case, however, in FIG. 3, what corresponds to the aluminum-deposited-film 40d of FIG. 4 is a bonding agent or the like which has a refractive index different from that of, for example, the glass bead 40a.

The action of the bidirectional atmospheric optical transmission system in the example of FIG. 2 will be described next with reference to waveform diagrams forming FIGS. 5A to 5C.

The CPU 21 at the transmitting side 20 supplies transmission data to the modulator 22 during the modulation interval $T_1$ whereby the transmitted data is modulated into the modulated transmission signal 22a whose waveform is shown in FIG. 5A. This modulated transmission signal 22a is directly converted into the light signal 33 as a change of a light emission output from the laser diode 24. A part of light passing through the optical recursive reflection member 40 at the receiving side 35 is converted into the photo-electric conversion signal 42a by the light receiving element 41 and the pre-amplifier 42. Accordingly, the waveform of the photo-electric conversion signal 42a is similar to that of the modulated transmission signal 22a of FIG. 5A and the demodulated signal which results from demodulating the photo-electric conversion signal 42a by the demodulator 43 is supplied to the CPU 36 at the receiving side 35 with the result that the transmission data from the transmitting side 20 is directly transmitted to the receiving side 35.

Even in this modulated interval $T_1$, about 80% of the light signal 33 is directly reflected in its incident direction by the optical recursive reflection member 40 to be a reflected light signal 44. This reflected light signal 44 is converged at one end of the optical fiber bundle 28 by the lens system 27 and then becomes incident on the light receiving element 29. The output from the light receiving element 29 is amplified by the pre-amplifier 30 to become a photo-electric conversion signal 30a whose waveform is shown in FIG. 5C. The photo-electric conversion signal 30a within the modulated interval $T_1$ is similar to the modulated transmission signal 22a so that the CPU 21 is allowed to neglect the demodulated data of the photo-electric conversion signal 30a.

When the supply of the transmission data from the transmitting side 20 is ended, in response to the command of the non-modulation interval from the CPU 21, the modulator 22 produces the modulated transmission signal 22a that keeps high level "1" only during the constant period $T_2$ as shown in FIG. 5A. This modulated transmission signal 22a is used directly as the photo-electric conversion signal 42a of the receiving side 35. This constant period $T_2$ is referred to as a non-modulation interval. Although this photo-electric conversion signal 42a is supplied as it is to the CPU 36 via the demodulator 43, the CPU 36 determines, if the data supplied thereto keeps high level "1" during a period longer than a period $\Delta T$, that the transmitting side 20 is in the non-modulation interval $T_2$ and produces a simple information such as an ID number or the like as the return data 36a as shown in FIG. 5B. At that time, a voltage corresponding to the transmission data 36a is applied through the liquid crystal cell drive circuit 39 to the liquid crystal cell 38 shown in FIG. 2 so that the liquid crystal cell 38 intercepts, if the transmission data 36a is at high level "1", the reflection light signal 44, while the liquid crystal cell 38 allows, if the transmission data 36a is at low level "0", the reflected light signal 44 to pass therethrough. Accordingly, the photo-electric conversion signal 30a at the transmitting side 20 is presented as a NOT signal of the transmission data 36a (see FIG. 5B) during the non-modulation interval $T_2$ as shown in FIG. 5C. This photo-electric conversion signal 30a is supplied as it is to the CPU 21 via the demodulator 31. In this way, the transmission data at the receiving side 35 is directly supplied to the transmitting side 20 by utilizing the light signal 33 at the transmitting side 20.

As described above, according to the bidirectional atmospheric optical transmission system of this embodiment, since the receiving side 35 does not need a light source and a lens system for generating a light signal, the receiving side 35 can be miniaturized and made at low cost.

Further, since the light signal 33 at the transmitting side 20 and the reflected light signal 44 from the receiving side 35 are substantially parallel to each other, the optical axis 32 of the transmitting side 20 is equal to that of the receiving side 35, thus requiring only the optical axis adjusting work in which the light signal 33 is introduced into the polarizing plate 37. Therefore, the optical axis adjustment is very easy.

Further, with respect to the optical axis adjustment, in accordance with this embodiment, since the receiving side 35 uses the optical recursive reflection member 40 so that the reflected light signal 44 is always returned to the direction of the light signal 33, it is not necessary to locate the receiving side 35 in an accurately-opposing relation to the transmitting side 20.

Further, since the receiving side 35 in this embodiment does not include a light source and an element which consumes a large electric power, this receiving side 35 can be, even when it is formed as, for example, a card-shaped one, driven by a small dry battery half-permanently. In this case, a part of the output from the light receiving element 41 may be converted into electric power to charge the built-in battery.

Further, the optical recursive reflection member 40 in this embodiment is not limited to such one that employs the glass beads 40a but may be such one that is formed by the combination of a so-called fly-eye lens formed by the collection of, for example, very small lenses and a half-transparent mirror. Further, the optical recursive reflection member 40 might be a corner cube. While the supply of the light signal 33 to the light receiving element 41 is carried out by the structure having an independent half transparent mirror, the structure of this embodiment is particularly compact-sized.

An example in which the bidirectional atmospheric optical transmission system of the present invention is applied to an assembly part supplying system will be described with reference to FIG. 6.

As FIG. 6 shows, there is provided a conveyor robot 50 that conveys assembly parts. This conveyor robot 50 is cyclically moved along predetermined rails. This conveyor robot 50 is provided with the transmitting side 20 shown in the example of FIG. 2 as it is and is also provided with a scanner 52 which transmits the output light signal 33 over an angle $\theta$ so that the light signal 33 is transmitted over the angle $\theta$ as a scanning signal 58.

Parts-storages 53a, 53b, 53c and 53d are respectively located, which include transparent containers 55a, 55b, 55c and 55d in which are detachably held stock administration cards 54a, 54b, 54c and 54d, respectively. Each of the stock administration cards 54a, 54b, 54c and 54d includes the receiving side 35 of the example shown in FIG. 2 and the receiving side 35d of, for example, the card 54d is the same as the receiving side 35 shown in FIG. 2. The stock administration cards 54a to 54d are provided with data keys 57a to 57d that are used to input the number of stocks, respectively.

Upon use, the operator opens, for example, a drawer 56d to confirm the stock of the assembly parts and inputs the corresponding data into the stock administration card 54d by using the data key 57d. Thereafter, the conveyor robot 50 is conveyed along the rails 51 while producing the scanning signal 58 over the angle $\theta$. When the scanning signal 58 is located at the position indicated as, for example, shown by an arrow 59, a reflected light signal 60 is transmitted back to the robot 50 from the stock administration card 54a so that the conveyor robot 50 transmits data request command within the modulation interval $T_1'$ as shown in FIG. 7A. In correspondence therewith, the stock administration card 54a transmits the ID number and the number of stocks to the conveyor robot 50 as the transmission data 36a after the period $\Delta T$ within the non-modulated interval $T_2'$ as shown in FIG. 7B. When the number of stocks is less than the standard number, the conveyor robot 50 is operated to supplement the assembly parts. In this way, the assembly parts can be supplemented automatically.

The bidirectional atmospheric optical transmission system of the present invention is not limited to the automatic parts supplying system shown in FIG. 6 but can be applied to, for example, an object/man recognition system, a vacant seat display system, a product-/book retrieval system, a collision-avoidance system for aircrafts, ships, vehicles and the like, an interactive-type display system, an object radar system and the like. Further, it is easy to arrange such a system in which each member in the diet holds the receiving side 35 of the example of FIG. 2 in the form of a card so that the number of approval or disapproval can automatically be collected.

According to the bidirectional atmospheric optical transmission system of the present invention, since the light signal from the transmitting side is modulated by the receiving side during the non-modulation interval and reflected back to the transmitting side, the receiving side does not need the optical system including the light source so that the receiving side can be miniaturized and also made at low cost, while the power consumption of the receiving side can be suppressed low. Further, optical axis adjustment between the transmitting side and the receiving side can be carried out with ease.

Furthermore, since the receiving side is formed of the optical recursive reflection member and the electrical optical shutter, the receiving side is not necessarily located in an exactly correct opposing relation to the transmitting side.

Figure 8:
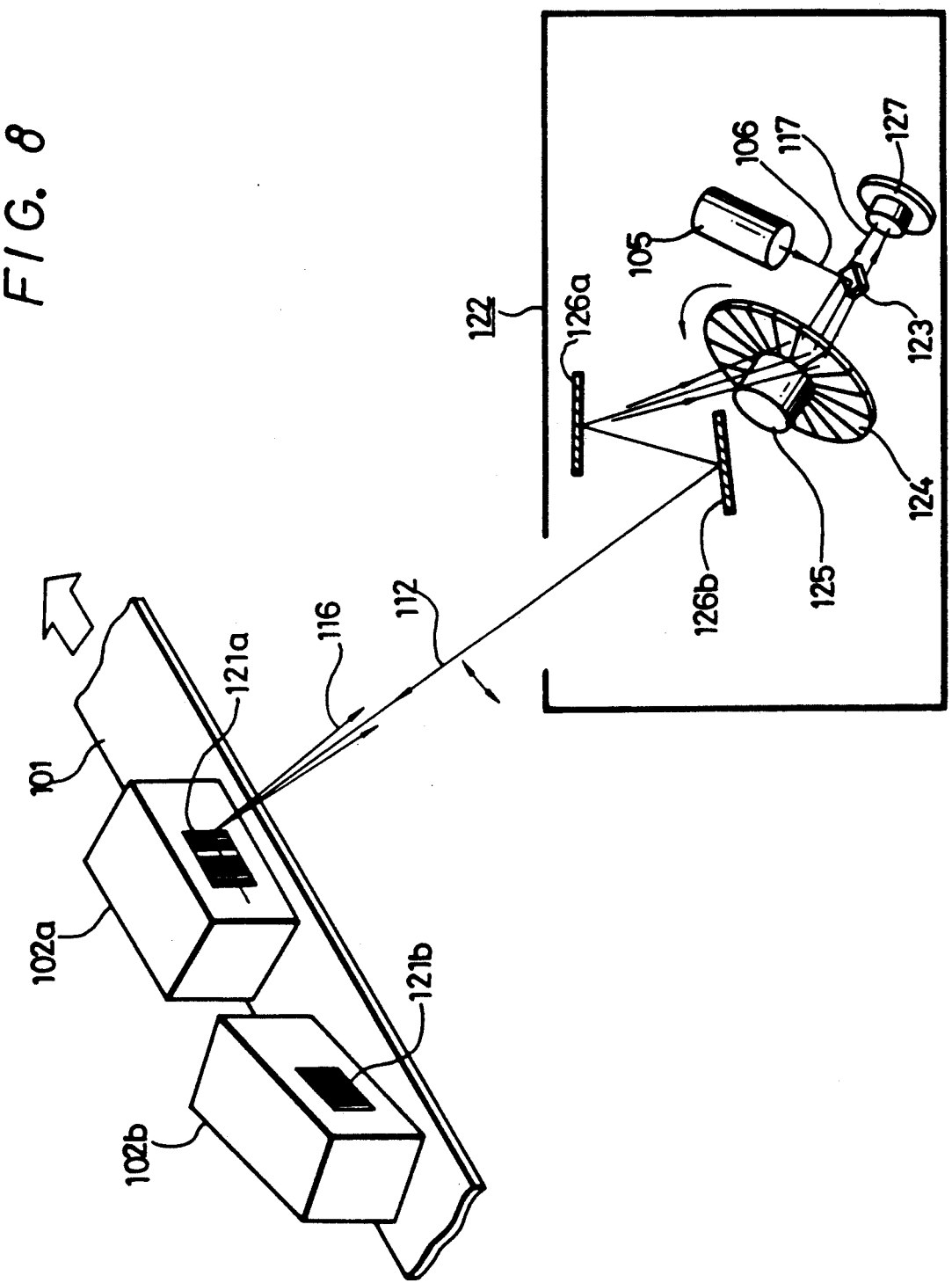
FIG. 8 is a schematic representation of a physical distribution administration system which utilizes a bar code of the present invention.

Subsequently, a first embodiment of a so-called bar code which employs the optical recursive reflection member according to the present invention will be described with reference to FIGS. 8 and 9. FIG. 8 illustrates an example of administration system that employs the bar code of the first embodiment of the present invention.

In this embodiment, as shown in FIG. 8, articles or goods 102a and 102b are put on a conveyor 101, and positive beads-type bar codes 121a and 121b are attached on these goods 102a and 102b, respectively. The arrangement of the positive beads-type bar code 121a will be described in detail with reference to FIG. 9.

Figure 9:
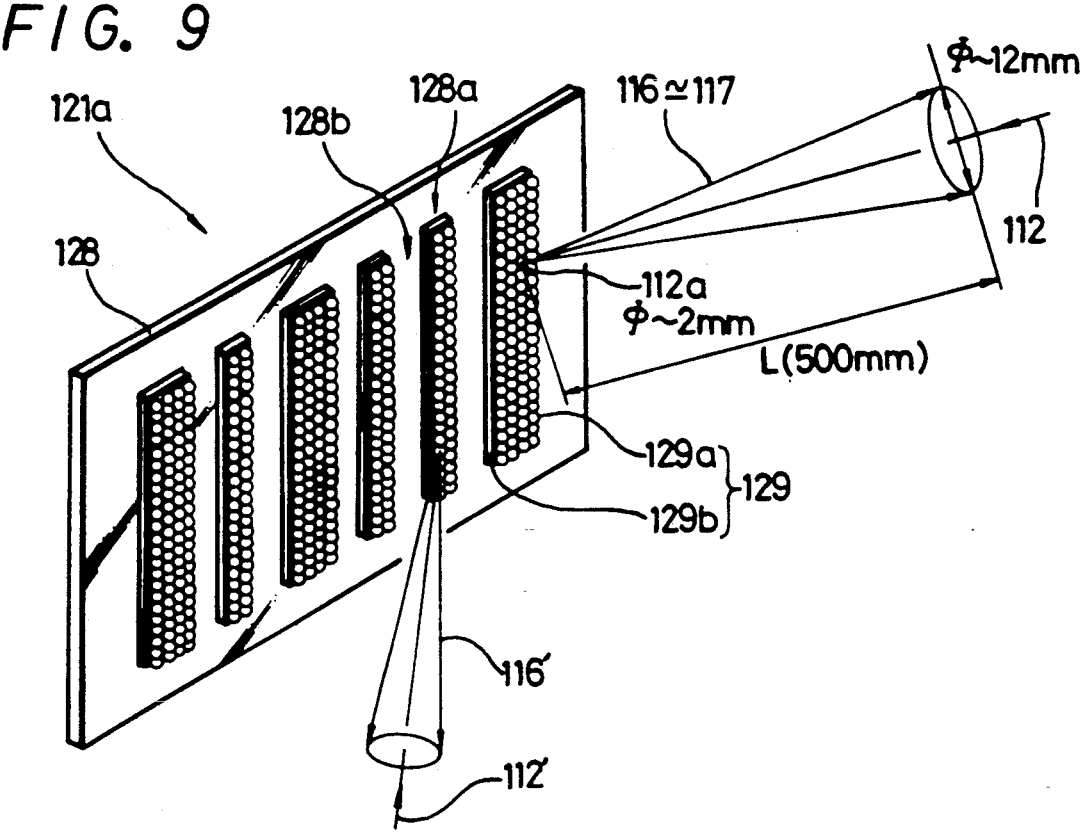
FIG. 9 is a perspective view of a first embodiment of a bar code according to the present invention.

As FIG. 9 shows, there is provided a substrate 128 made of a cardboard or the like. A bright portion 128a is formed on the substrate 128 to reflect a light incident thereon. An optical recursive reflection member 129 is bonded on the bright portion 128a of the substrate 128, while a dark portion 128b on the substrate 128 is not treated at all but is left as the surface of the substrate 128. This dark portion 128b which does not reflect the light incident thereon may be formed by printing a black color which absorbs a light. Similarly to the description made in connection with FIG. 3, the optical recursive reflection member 129 is formed by bonding a large number of very small glass beads 129a without spacing thereamong on a base paper 129b which reflects a light. Thus, when a scanning light signal or beam 112 becomes incident on the optical recursive reflection member 129, it returns a reflection light 116 in substantially the direction of the incident light. Accordingly, if the scanning light beam is introduced into the optical recursive reflection member 129 from the direction shown by an arrow 112' in FIG. 9, then most of power of a reflection light 116' is concentrated in the incident direction 112'.

According to the experimental results in which the glass bead 129a is such one that is selected by a sieve of 200 meshes per inch, or the diameter d of the glass bead 129a is about 0.1 mm, when a diameter $\phi$ of a beam spot 112a of the scanning light beam 112 on the optical recursive reflection member 129 was about 2 mm and the distance L from the beam spot 112a was about 500 mm, the reflected light 116 was substantially distributed in a circle of about 12 mm in diameter $\Phi$ that was formed around the incident direction of the scanning light beam 112. This reflected light 116 is an effective reflected light 117 that is a component which becomes substantially directly incident on a light receiving element that will be described later. If a solid angle $\omega$ of the reflected light 116 in FIG. 9 is calculated in order to perform the comparison with the prior art, the solid angle $\omega$ is expressed as $$\omega \sim \pi \times 10^{-4} \text{ (sr)}$$

While, if a solid angle $\omega_0$ of the prior art reflected light is selected as about ½ of the hemisphere, or as $\omega_0 \sim \pi/2 \text{(sr)}$, then a power P of the effective reflected light 117 of FIG. 9 and a power $P_0$ of the prior art effective reflected light are respectively in inverse proportion to the solid angle of the reflected light so that they are expressed by the following equation as given by $$P/P_0 \sim \omega_0/\omega \sim 5 \times 10^3$$

Consequently, the power of the effective reflected light 117 becomes more than about 1000 times as compared with that of the prior art. According to the experimental results of the present inventors, the assignee of the present application obtained data which support the above-mentioned result.

The principle that the optical recursive reflection member 129 using the glass beads 129a of FIG. 9 has an optical recursive property was already explained in connection with FIG. 3 on a logical basis.

In this case, the diameter d and the refractive index n of the glass bead 129a used are adjusted and determined in response to the wavelength region of the scanning light, the minimum line width of the bar code, etc. Further, the glass beads 129a can be directly formed on the base plate or substrate 128 by the printing-process in FIG. 9.

The action brought about when the bar code of this embodiment is used will be described next.

Referring to FIG. 8, there is provided a bar code reader 122 that is used to read a bar code. In the bar code reader 122, a laser beam 106 emitted from a laser tube 105 is partly reflected on a very small half mirror 123 and is made incident on a hologram disc 124. The hologram disc 124 is constructed by forming on a disk diffraction gratings whose spatial frequencies are successively changed with an equal pitch. The laser beam 106 is converted into a scanning light beam 112 by rotating the hologram disc 124 by a motor 125. The scanning light beam 112 is changed in direction by reflection mirrors 126a and 126b so that it scans the bar code 121a attached to, for example, goods 102a. Also, a reflection light 116 from the bar code 121a is converged by the hologram disc 124 through the reflection mirrors 126b and 126a and is made incident on a light receiving element 127 such as a photo-diode or the like.

Since the bright portion 128a of the bar code 121a has the optical recursive property as described above, the reflected light 116 on the bright portion 128a is substantially equal to the effective reflection light 117. To be more concrete, the solid angle of the reflection light 116 is about less than 1/1000 of that of the prior art, while the power of the effective reflection light 117, i.e., the output signal of the light receiving element 127 becomes substantially more than 1000 times that of the prior art. Accordingly, as the light receiving element 127, it is not necessary to use an expensive device such as a multiplier phototube or the like and the circuit arrangement of an amplifying circuit can be simplified considerably.

Further, since the reflection light from the bright portion 128a of the bar code 121a has the optical recursive property, even when the bar code 121b is not located perfectly opposite to the bar code reader 122 as in the merchandise 102b in FIG. 8, the power of the effective reflection light 117 is about the same as that of the merchandise 102a so that the code can be positively identified. Also, the S/N (signal-to-noise) ratio of the signal is improved so that even when the conveyor 101 is moved at high speed or even when the merchandise 101a and the bar code reader 122 are located very distant from each other, the code can be identified positively.

The second embodiment of the bar code according to the present invention will be described with reference to FIG. 10.

Figure 10:
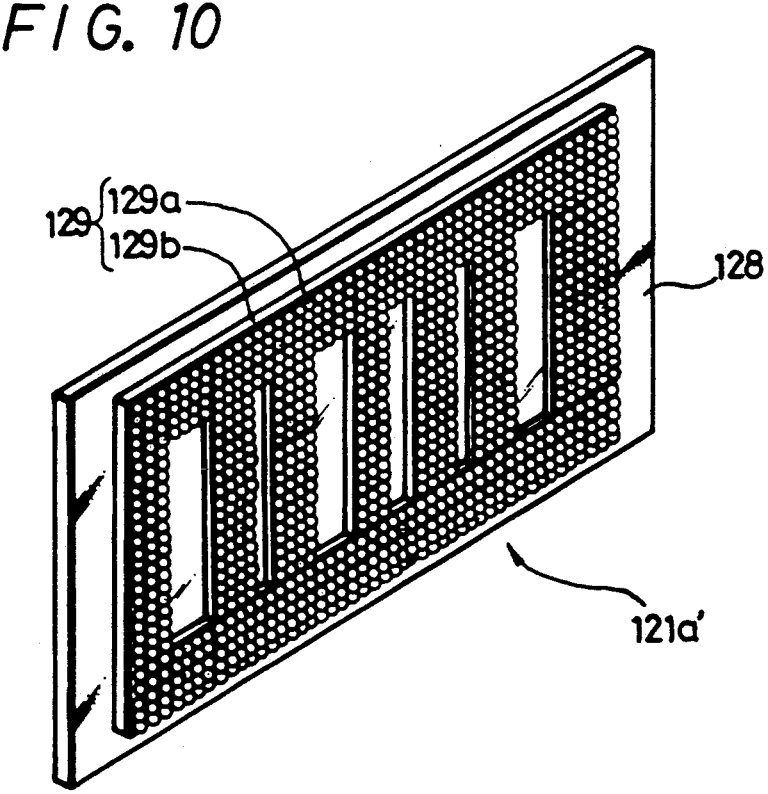
FIG. 10 is a perspective view of a second embodiment of the bar code according to the present invention.

FIG. 10 generally illustrates a bead bar code 121a' of negative type wherein the bright portion and the dark portion are reversed as compared with that shown in FIG. 9. This type of bar code 121a' is formed by cutting an optical recursive reflection member 129 formed of glass beads 129a bonded on the base plate or substrate 128 and the mount 129b at its portion corresponding to the bright portion 128a of FIG. 9. Since the negative-type bar code 121a' has a wide light reflection area, there is an effect that it is very convenient to detect the place of the code.

The third embodiment of the bar code according to the present invention will be described with reference to FIG. 11.

Figure 11:
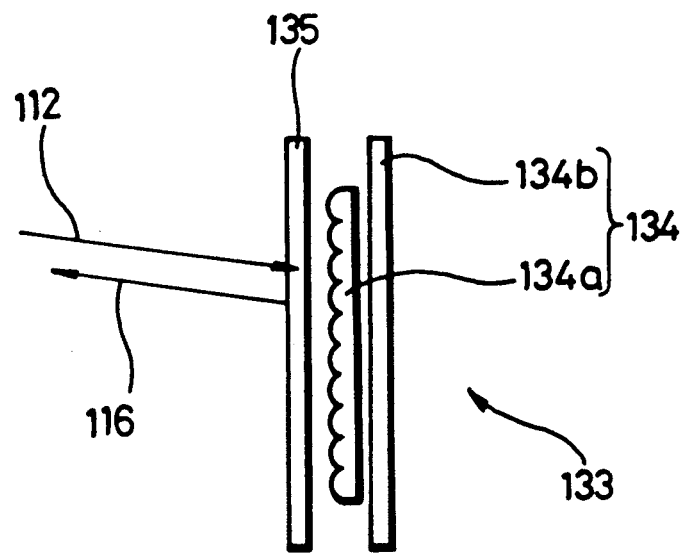
FIG. 11 is a side view illustrating a third embodiment of the bar code according to the present invention.

Referring to FIG. 11, there is provided a fly-eye lens-type bar code 133. An optical recursive reflection member 134 acts to cause a scanning light beam 112 for this bar code 133 to return as the reflection light 116 in the direction substantially equal to the direction in which the scanning light beam 112 becomes incident on the optical recursive reflection member 134. This optical recursive reflection member 134 is formed by a so-called fly-eye lens 134a, which is formed by collecting very small lenses and a reflection mirror 134b. In the portion corresponding to the dark portion of the bar code, the fly-eye lens is replaced with a medium which absorbs or scatters a light. In this embodiment, an infrared ray transmitting filter 135 is disposed in front of the fly-eye lens 134a, whereby the bar code can be formed as a secret bar code that cannot be visually identified.

The principle of the third embodiment of the present invention will be described with reference to FIG. 12.

Figure 12:
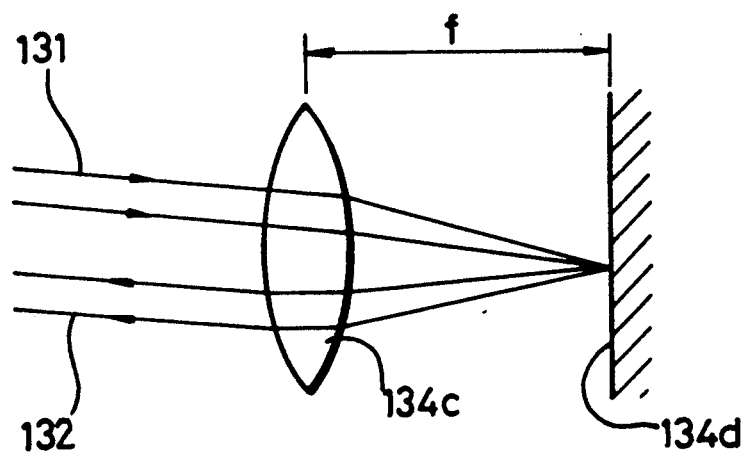
FIG. 12 is a schematic representation used to explain a principle of a fly-eye lens used in the third embodiment of the present invention shown in FIG. 11.

In FIG. 12, reference 134c designates a convex lens and 134d a reflection mirror which is disposed on the focal plane of the convex lens 134c. This layout of the convex lens 134c and the reflection mirror 134d forms a so-called cat's eye so that an incident light 131 is reflected to the direction parallel to the incident direction as a reflected ray of light 132, thus providing an optical recursive property. Accordingly, the optical recursive property is also given to the fly-eye lens type bar code 133 of FIG. 11 which is equivalent to the bar code in which a number of very small cat's eyes are arranged.

A fourth embodiment of the bar code according to the present invention will be described with reference to FIG. 13. In this embodiment, the present invention is applied to a code-variable bar code 136 of which the code can be varied by a mechanical shutter.

Figure 13:
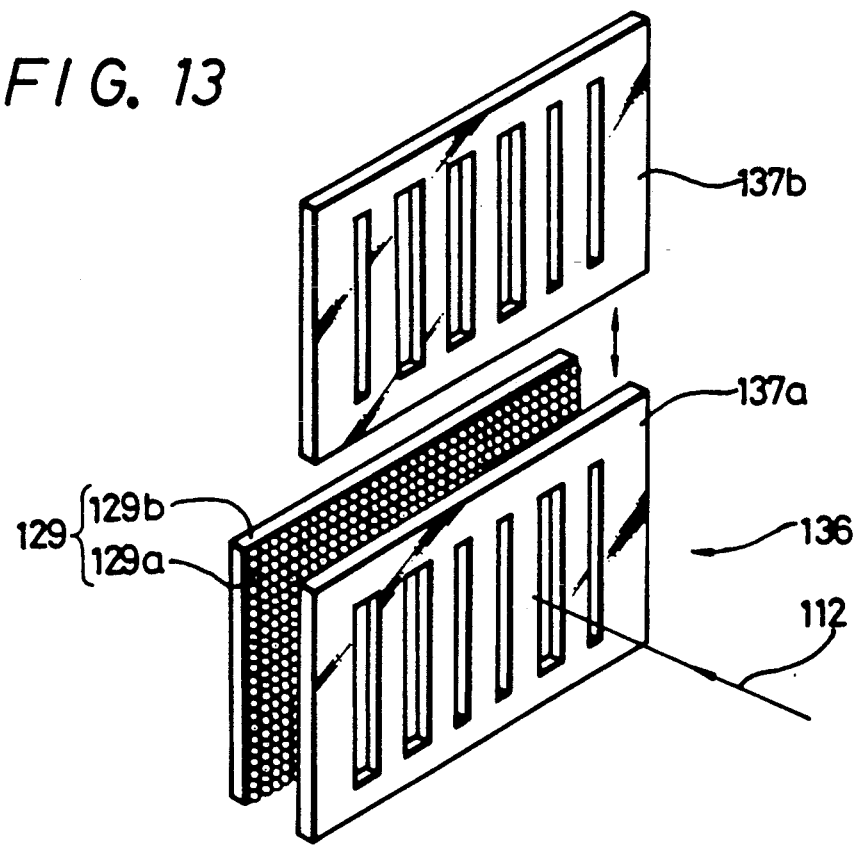
FIG. 13 is a perspective view illustrating a fourth embodiment of the bar code according to the present invention.

As FIG. 13 shows, the code-variable bar code 136 is comprised such that an optical recursive reflection member 129 formed of glass beads 129a and a mount 129b is provided on the whole surface of its rear portion and a code plate 137a of which the portion corresponding to the bright portion of the bar code is cut away is provided on the front wall thereof so as to become freely detachable. According to this embodiment, by replacing the code plate 137a with a code plate 137b on which a different code is formed, it is possible to display different codes in response to the situation of the goods with the bar code and the work.

A fifth embodiment of the bar code according to the present invention will be described with reference to FIG. 14.

Figure 14:
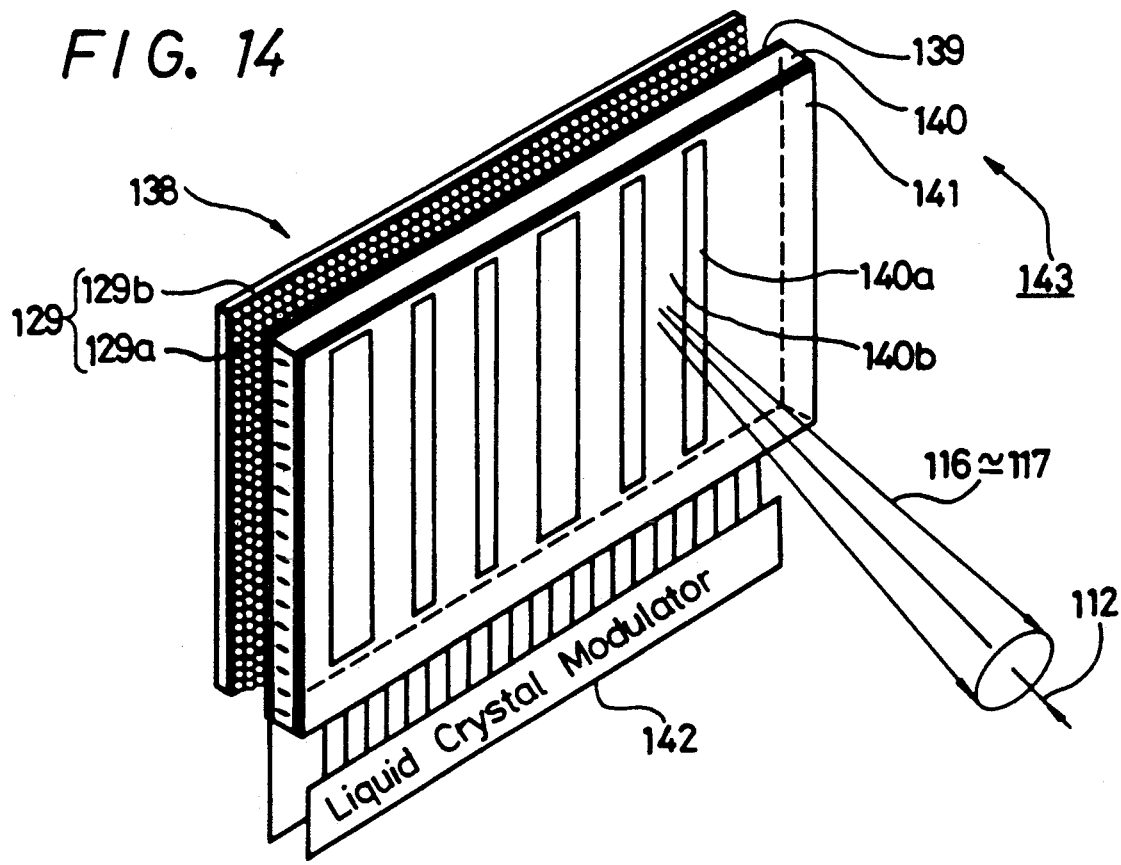
FIG. 14 is a perspective view illustrating a fifth embodiment of the bar code according to the present invention.

In FIG. 14, reference numeral 138 generally designates a bar code which can be modulated by an optical shutter that can be electrically switched. This modulation bar code 138 includes an optical recursive reflection member 129 forming on its rear side a number of glass beads 129a bonded on a mount 129b and an electrooptical shutter 143 formed on its front wall so as to modulate a code. The electrical and optical shutter 143 includes a polarizing plate 139, an T-N (twisted-nematic) effect type liquid crystal cell 140, a polarizing plate 141 whose polarizing direction is perpendicular to that of the polarizing plate 139, and a liquid crystal modulator 142 which drives an electrode corresponding to a predetermined code in the liquid crystal cell 140 A portion 140a applied with an AC voltage in the liquid crystal cell 140 intercepts a light by the action of the polarizing plates 139 and 141 and a portion 140b, which is not applied with the AC voltage, permits the traveling of light as it is so that the scanning light beam 112 reaches therethrough the optical recursive reflection member 129, in which it is reflected in substantially the same direction as the direction of the light incident thereon thereby producing the reflected light 116. This reflected light 116 becomes the effective reflected light 117 directly.

In this embodiment, the effective reflected light 117 can be improved considerably and the code can be modulated at high speed in response to the situation of the merchandise.

Incidentally, the liquid crystal cell 140 might be other liquid crystal cell such as an electrically-controlled birefringence (ECB)-type liquid crystal cell. In this case, the polarizing plate 139 can be omitted. Further, as the electrical and optical shutter 143, there can be considered various types, in addition to the liquid crystal type.

Figure 15:
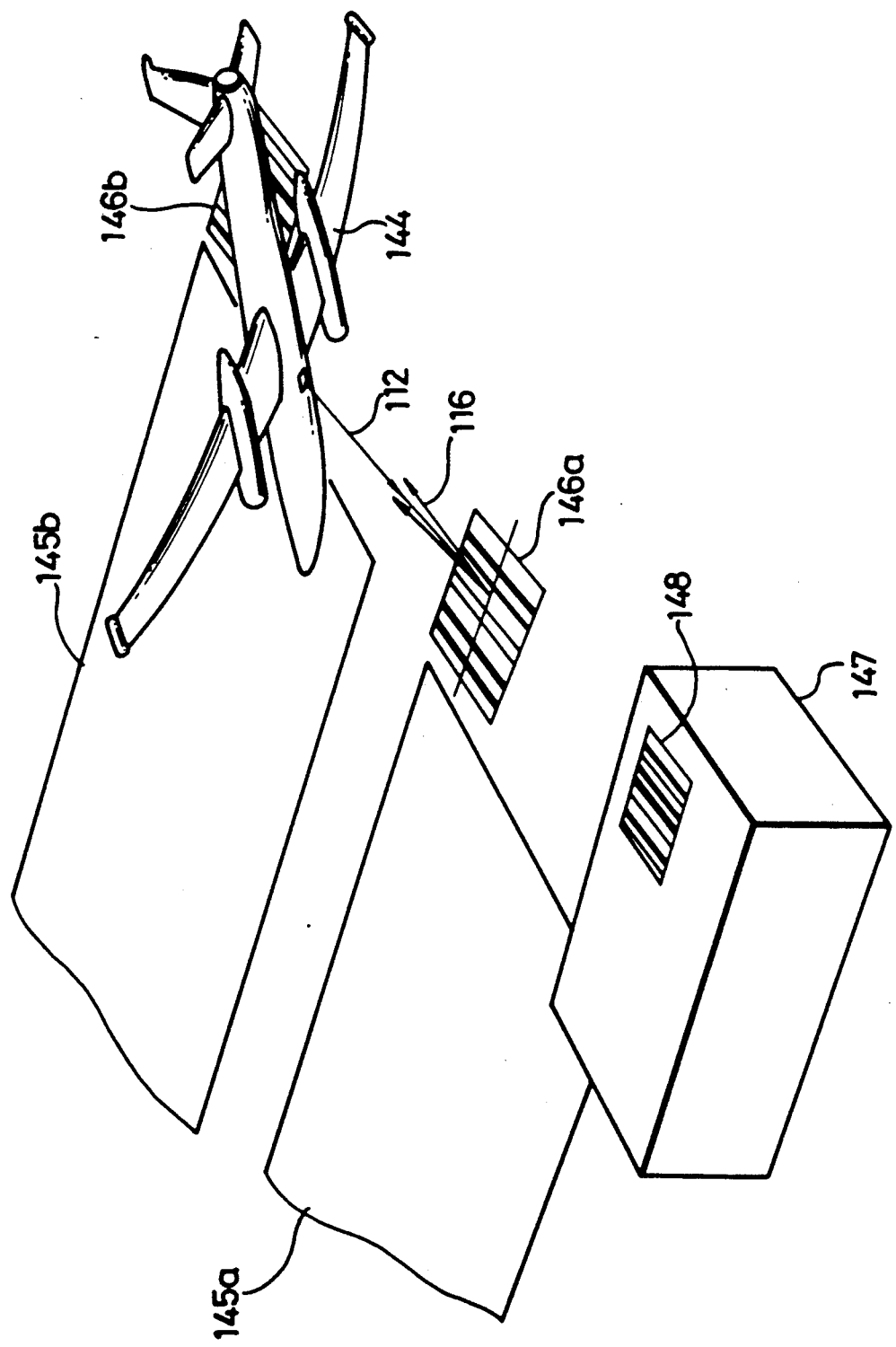
FIG. 15 is a perspective view illustrating an example of an air-traffic control system which utilizes the bar code of the present invention.

With reference to FIG. 15, an example of air-traffic control system using a bar code will be described as other usage of the bar code of the present invention.

In FIG. 15, reference numeral 144 designates an aircraft which transmits the scanning light beam 112, reference numerals 145a and 145b designate runways, respectively and reference numeral 147 designates a control tower. These constructions 145a, 145b and 147 are provided with bar codes 146a, 146b and 148 utilizing the optical recursive reflection members according to the present invention. Accordingly, the aircraft 144 can easily identify these constructions by reading these bar codes 146a, 146b and 148 by means of the scanning light beam 112 emitted therefrom, making the air-traffic control more safe.

In this case, according to the bar code utilizing the prior art irregular reflection surface, if the aircraft 144 flies high in the sky at high speed, the effective reflected light is so weak that this air-traffic control system cannot be put into practice.

On the other hand, according to the bar code using the optical recursive reflection member of the present invention, most of the reflected light 116 is concentrated around in the direction of the scanning light beam 112 and returned so that the aircraft 144 can positively identify the respective bar codes 146a, 146b and 148 with ease.

Further, the bar code of the present invention can be applied to a POS (point of sale) system, collision-avoidance system for vehicles, interactive-type traffic sign, stock administration for parts, retrieval for documents, document administration, and the identification of secret code by means of infrared laser combined with an infrared-transparent filter, etc. Particularly, when the optical recursive reflection member is formed by printing, for example, the glass beads or the like on the document and this optical recursive reflection member is used to form the inexpensive bar code of which the effective reflected light is improved, the document administration and the like can be made more effectively.

Furthermore, by utilizing a scanner that is proposed by the assignee of the present application as Official Gazette of Japanese Laid-Open Patent Application No. 59-124368, it is possible to provide a more inexpensive system.

In addition, the present invention can be applied to a system in which a defocused laser beam is irradiated on the bar code and the reflected light therefrom is received by a CCD (charge coupled device) or the like thereby decoding a code.

As described above, since the bar code of the present invention is made by utilizing the optical recursive reflection member which reflects an incident light in substantially the direction of the light incident thereon, the power of the effective reflected light to the bar code reader can be increased remarkably as compared with the prior art, the light receiving section can be simplified in arrangement and produced at low cost.

Further, the power of the effective reflected light is large so that even when a distance between the bar code and the bar code reader is long and a relative displacement speed therebetween is high, the code can be read out positively.

Furthermore, since the bar code includes the optical recursive reflection member and the electrical and optical shutter which can modulate the code, it is possible to display different codes in response to the situation of the articles attached with the bar code.

It should be understood that the above description is presented by way of example on the preferred embodiments of the present invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. An apparatus for detecting modulated information from light emitted by a transmitting side and turned around or reflected by a receiving side, comprising:

light signal emitting means arranged at the transmitting side for emitting a plurality of light signal pulses followed by an interval of emitting a substantially constant light signal, the receiving side including an optical recursive reflection member for reflecting back a portion of a light signal incident thereon in substantially the same direction as said incident light signal and for passing a portion of the light signal incident thereon, an electrically operable shutter disposed adjacent a reflection surface side of said optical recursive reflection member to selectively modulate light reflected by said reflection member passing therethrough, and processor means for receiving said portion of the light signal passed by said reflection member and producing a coded modulation signal fed to said shutter for causing said shutter to modulate light reflected by said reflection member during said interval of a substantially constant light signal, thereby acknowledging receiving the plurality of light signal pulses from the transmitting side.

2. An apparatus according to claim 1, wherein said optical recursive reflection member includes reflecting elements and non-reflecting elements arranged into a bar code.

* * * * *